US006202208B1

United States Patent
Holiday, Jr.

(10) Patent No.: US 6,202,208 B1
(45) Date of Patent: Mar. 13, 2001

(54) PATCHING ENVIRONMENT FOR MODIFYING A JAVA VIRTUAL MACHINE AND METHOD

(75) Inventor: Matthew R. Holiday, Jr., Allen, TX (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/162,824

(22) Filed: Sep. 29, 1998

(51) Int. Cl.$^7$ .................................................. G06F 9/445
(52) U.S. Cl. ........................ 717/11; 711/6; 707/103 R; 717/10
(58) Field of Search ................................ 717/1, 3, 4, 10, 717/11; 711/1, 6, 133, 159; 712/227, 248; 714/8, 5, 3; 707/101, 206, 103 Z, 103 R, 104, 200

(56) References Cited

U.S. PATENT DOCUMENTS

| | | | |
|---|---|---|---|
| 4,542,453 | * 9/1985 | Patrick et al. ........................... | 714/8 |
| 4,751,703 | * 6/1988 | Picon et al. ............................. | 714/8 |
| 5,481,713 | * 1/1996 | Wetmore et al. ....................... | 717/5 |
| 5,619,698 | * 4/1997 | Lillich et al. .......................... | 717/10 |
| 5,790,860 | * 8/1998 | Wetmore et al. ....................... | 717/5 |
| 5,822,591 | * 10/1998 | Hochmuth .............................. | 717/5 |
| 5,873,104 | * 2/1999 | Tremblay et al. ................... | 707/206 |
| 5,953,736 | * 9/1999 | O'Connor et al. ..................... | 711/6 |
| 6,049,672 | * 4/2000 | Shiell et al. ........................... | 717/11 |
| 6,072,953 | * 6/2000 | Cohen et al. .......................... | 717/10 |

OTHER PUBLICATIONS

Jensen et al., "Security and Dynamic Class Loading in Java: A Formalisation," IEEE Proceedings, 1998 International Conference on Computer Languages, May 14–16, 1998, pp. 4–15.*

Bechini et al., "Design of a Toolset for Dynamic Analysis of Concurrent Java Programs," IWPC '98 Proceedings, 6th International Workshop on Program Comprehension, Jun. 24–26, 1998, pp. 190–197.*

* cited by examiner

Primary Examiner—Kakali Chaki
Assistant Examiner—Tuan Q. Dam
(74) Attorney, Agent, or Firm—Carr & Storm, L.L.P.

(57) ABSTRACT

The invention includes a patch environment for a modifying a program executed by a Java Virtual Machine ("JVM") while the program is being executed. The patch environment has a patch data structure defined on an electronic memory of the computer. The patch data structure has at least one Java patch for modifying a loader environment of the JVM. A plurality of data items contained in a data structure defined on the electronic memory of the computer represents each patch of the patch data structure. A second data item is contained in a second data structure defined on the electronic memory of the computer, the data item representing each applied patch of the patch data structure that modifies the loader environment of the JVM. The method of the present invention applies an ordered set of changes to a Java program while running under the control of a Java Virtual Machine having a loader environment which manages the program's loaded software. A patch environment is created such that the patch environment can alter the loader environment of the JVM. A patch file is generated containing a change to be applied to the loaded software and is loaded into the patch environment. The patch is then applied to the loaded software by changing the loader environment of the JVM while the Java program is running.

12 Claims, 6 Drawing Sheets

PATCHING ENVIRONMENT FOR MODIFYING A JAVA VIRTUAL MACHINE AND METHOD

TECHNICAL FIELD

The present invention relates in general to modifying an executing computer program, and in particular to a method and system for modifying a Java Virtual Machine ("JVM") with a patch environment.

BACKGROUND OF THE INVENTION

Large-scale, complex computer systems, are brought into use through integration of software programs with a hardware platform. Simply put, the software program is a detailed plan or procedure for solving a problem, that is executed on a hardware platform. The hardware platform includes a microprocessor or microprocessors and associated support circuits such as electronic memory (such as random-access-memory or RAM, hard disk memory, or card memory) and input/output port circuits so that information can be passed between components of the system and users.

A telecommunication network is an example of such a complex system. Telecommunication networks facilitate communications between a large number of public and private communications systems by providing numerous functions such as switching, accounting, and time management. A telecommunications network provides these functions through network switches, or nodes, interconnected by links, or channels, of transmission media such as wire, fiber-optic cable, or radio waves. Some of the nodes are connected to one or more users.

Modern telecommunication networks require complex, automated switching and, to that end, software programs are written to increase switching efficiency in telecommunications systems, along with implementing service features and functions (for example, call waiting and caller id). A computer language for implementing such software programs is "Java." Java was introduced by Sun Microsystems, Inc., of Palo Alto, Calif., and has been described as a simple, object-oriented, distributed, interpreted, robust, secure, architecture neutral, portable, high-performance, multithreaded, and dynamic computer language.

As with most software programs, a Java software program undergoes a debugging process to eliminate errors or malfunctions, also known as bugs, in the "detailed plan" or "procedure" for solving a problem. In this example, the problem solved is telephone network switching.

It is common for extensive debugging procedures to be conducted on a software package before it is installed on hardware platforms in the field. Nevertheless, some software bugs arise in a real-world environment because not all of the real-world contingencies can be simulated in a testing environment. Rarely are large-scale software systems, such as telecommunications software, without some errors that escaped product development testing. Such bugs may arise or be revealed within a short time of installation, or only after a period of time sufficient for operational conditions to reveal or cause a bug to appear.

While most switches are capable of loading a new Java software upgrade without stopping to correct and replace defective software, such loading of new software may result in undesirable effects and, furthermore, may not be feasible in many situations, such as during busy-hour processing, when a system may not have sufficient bandwidth to provide telephony service and simultaneously engage in a Java software upgrade. In such a case, the act of correcting the software bug may result in a worse service outage than resulted by the software bug itself. Telephone customers may then have to suffer with the bug until a suitable maintenance window becomes available to perform a wholesale software upgrade. Such a situation, however, is not acceptable because telephone switches which rely on the software are expected to experience no more than three minutes of downtime per year.

Alternatively, conventional patching techniques may be used to correct defective software without having a large impact on the performance or workload of the system. Such patching techniques, however, are limited to correcting relatively minor software defects.

While there are drawbacks associated with software corrective techniques, such as the aforementioned loading and/or patching of software without stopping, such techniques are not even available with most large-scale complex computer systems outside of the telecommunications industry.

Accordingly, a continuing search has been directed to the development of methods by which a defective software program may be corrected or modified without stopping the program, and without degrading the performance or workload capacity of the system controlled by the program. Such a continuing search has been further directed to a method by which a defective software program may be corrected or modified without requiring the wholesale installation and/or upgrade of a software application program and the associated labor costs, even if the program must be stopped.

SUMMARY OF THE INVENTION

Accordingly, provided is an apparatus and method to implement controlled incremental changes to a Java software application while being executed. The controlled incremental changes to a Java Virtual Machine (JVM), which operates to execute the Java software application, is made through a patch environment. The patch environment may implement the changes while the program is executing on the host computer, or without reloading the entire Java software application.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The Java language is computer architecture neutral and portable. Java programs are compiled to an architecture neutral byte-code format, allowing a Java application to run on any computer platform as either a stand-alone program or as a program fully integrated with an operating system used by the computer platform, as long as that platform implements the Java Virtual Machine ("JVM"). Examples of such computer platforms are personal computers ("PC"), Macintosh computers, and Unix workstations. The operating systems, which are programs responsible for controlling the allocation and usage of hardware resources such as memory, central processing unit ("CPU") time, disk space, and peripheral devices, come in numerous varieties such as Unix, Windows 98, Windows NT for PCs and PowerPC Macintosh. Java programs can run on any of these operating systems.

The JVM has a clear mission: to run one Java application. When a Java application starts, a runtime instance is spawned. Each Java application runs inside its own JVM.

Figure 1:
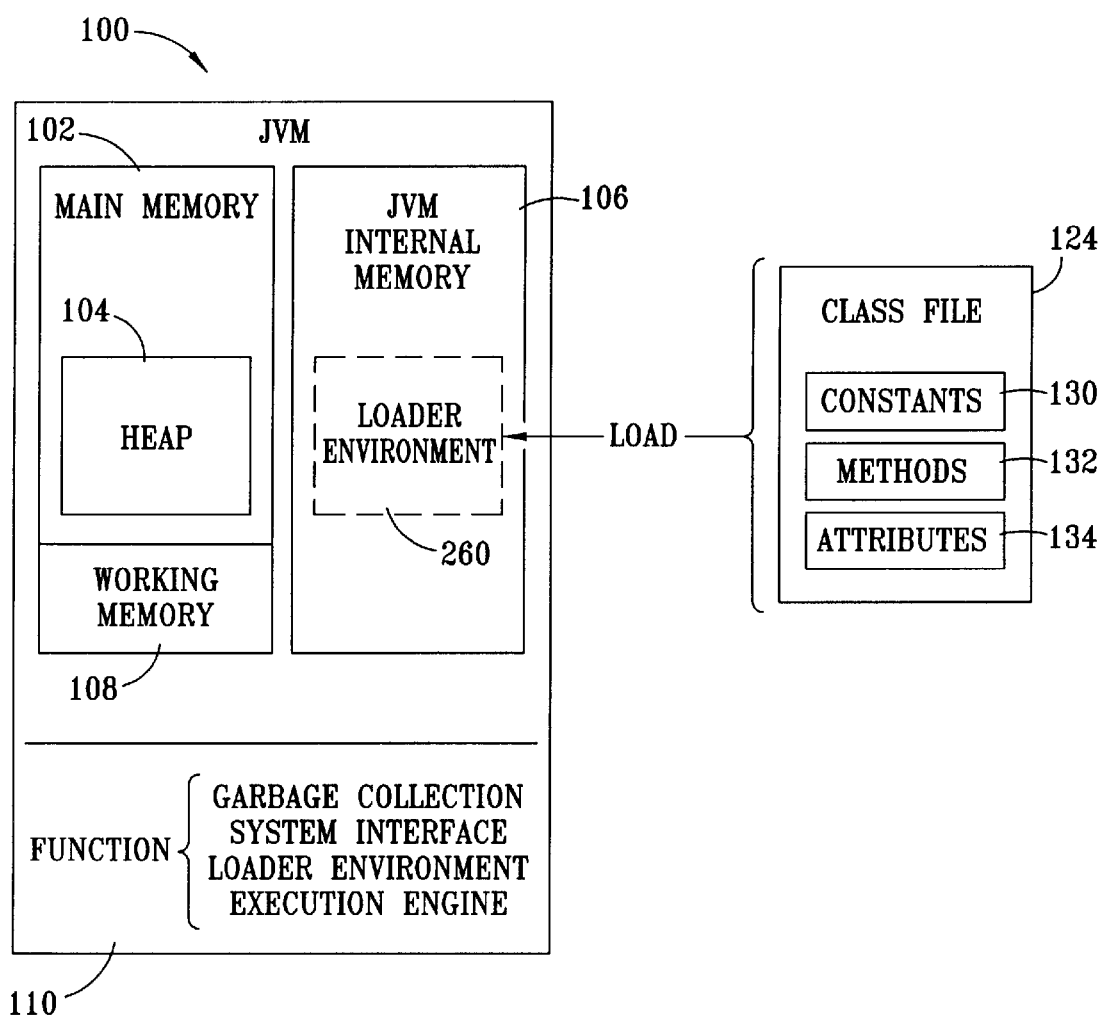
FIG. 1 is a block diagram illustrating a Java Virtual Machine ("JVM")

Referring to FIG. 1, illustrated is a JVM 100. The JVM 100 includes a main memory 102 with a heap 104, and a JVM internal memory 106. The main memory 102 is further partitioned to define a working memory 108. The main memory 102 is the environment in which a Java program runs. The JVM 100 also includes a function component 110 for providing a garbage collection function, a system interface, a loader environment, an execution engine, and the like, including threads defined by the architecture of the JVM 100, discussed below.

Generally, a thread is a process that is part of a larger process or Java program. The conventional JVM specification establishes a threading model that seeks to facilitate implementation on a wide variety of computer and software architectures. The Java threading model allows implementation designers to use native threads (threads belonging to underlying operating systems). Alternatively, designers can implement a thread mechanism as part of their JVM implementation. An advantage to using native threads on a multiprocessor host is that different threads of a Java application can run simultaneously on different CPUs.

Threads can be either daemon and non-daemon. A daemon thread is a thread used by the JVM 100, such as a thread that performs garbage collection, discussed later in detail. The Java application, however, can mark any threads it creates as daemon threads. The initial thread of an application—the one that begins at main( )—is a non-daemon thread.

The JVM continues to exist as long as any non-daemon thread is running. When all non-daemon threads of a Java application terminate, the JVM instance will exit.

According to the JVM specification, the thread implementation of any JVM must support two aspects of synchronization: object locking, and thread wait-and-notify. Object locking helps keep threads from interfering with one another while working independently on shared data. Thread wait-and-notify helps threads to cooperate with one another while working together toward some common goal. Running-applications access the JVM locking capabilities via the instruction set, and its wait-and-notify capabilities via the wait( ), notify( ), and notifyAll( ) methods of class.

When the JVM 100 runs a Java program, memory is needed to store Java components, such as bytecodes and other information extracted from a loaded class file, objects the program instantiates, parameters to Java methods, return values, local variables, and intermediate results of computations.

Under the JVM Specification, the behavior of Java threads is defined in terms of variables, main memory, and working memory. The JVM Specification is a commercially-available document under the title "The Java Virtual Machine" by Tim Lindholm and Frank Yellin (1997), ISBN 0-201-63452-X, available from Sun Microsystems, Inc. or at Internet address http://www.aw.com/cp/javaseries.

The main memory 102, contains the Java program variables: instance variables of objects, components of arrays, and class variables. Each thread has a working memory 108, in which a JVM thread stores "working copies" of variables the thread uses or assigns. Local variables and parameters, because they are private to individual threads, can be logically seen as part of either the working memory 108 or the main memory 102.

When a class instance or array is created in a running Java application, the memory for the new object is allocated from the heap 104, which is in the portion of memory defined as the main memory 102. Because only one heap 104 exists inside a JVM 100, all threads share the heap 104. Also, because a Java application runs inside its "own" exclusive JVM instance, a separate heap 104 exists for every individual running application. In this manner, two different Java applications cannot corrupt the heap data of the other. However, two different threads of the same application could trample on the heap data of the other. For this reason, proper synchronization of multithreaded access to objects (heap data) in Java programs needs to be addressed.

The JVM 100 includes an instruction that allocates memory on the heap 104 for a new object but includes no instruction for freeing that memory. The JVM 100 is responsible for deciding whether and when to free memory occupied by objects that are no longer referenced by the running application. Usually, a JVM 100 uses a garbage collector thread to manage the heap 104.

The primary function of the garbage collector thread is to automatically reclaim the memory used by objects that are no longer referenced by the running-application. The garbage collector can also move objects as an application runs to reduce fragmentation of the heap 104. Fragmentation is the scattering of parts of an object in different areas of the heap 104, resulting in slower access and degradation of overall performance of memory operations.

A garbage collector is not strictly required by the JVM specification. The specification requires only that an implementation manage its heap 104 in some manner. For example, an implementation could simply have a fixed amount of heap space available and throw an OutOfMemory exception when that space fills up.

No garbage-collection technique is dictated by the JVM specification. Java designers can use whatever techniques seem most appropriate given their goals, constraints, and talents. Because program references to objects can exist in many places—Java Stacks, the heap, the loader environment, native method stacks—the choice of garbage-collection techniques heavily influences the design of the runtime data areas of an implementation.

A JVM 100 starts executing its solitary application by invoking the main( ) method of some initial class in a class file 124. The term "class" as used herein means a generalized category that describes a group of more specific methods that can exist within it, and are comparable in concept to the types of "pigeonholes" used to organize information. The term "method" as used herein means a procedure or a function. The data and methods, taken together, usually serve to define the contents and capabilities of some kind of object. Any class with such a main( ) method can be used as the starting point for a Java application. The main( ) method serves as the starting point for the initial thread of the application. The initial thread can in turn generate other threads.

The JVM 100 includes an execution engine which is a part of the object 110 and is a mechanism responsible for executing the instructions contained in the methods of loaded classes.

As shown in FIG. 1, the JVM internal memory 106 includes a loader environment 200 for loading types, i.e., classes and interfaces, having fully qualified names. The loader environment 200 is configured for storing metadata describing attributes about data types (or classes, such as data objects which go into the heap 104 and into the working memory 108) derived from the program and loaded through the class files and loader mechanism. These areas are shared by all threads running inside the JVM 100. When the JVM 100 loads a class file 124. the JVM 100 parses information about a "type" from the binary data contained in the class file 124. It places this type information into the loader environment 100. As the Java program runs, the JVM 100 places all objects the program initiates into the heap 104.

The JVM 100 computes by performing operations on data types. Both the data types and operations are strictly defined by the JVM Specification. The data types can be divided into a set of primitive types and a reference type. Variables of the primitive types hold primitive values, and variables of the reference type hold reference values. Reference values refer to objects but are not objects themselves. Primitive values, by contrast, do not refer to anything. They are the actual data themselves.

All the primitive types of the Java programming language, except boolean, are primitive types of the JVM 100. When a compiler translates Java source code into method bodies, it uses integers or bytes to represent booleans.

The primitive types of Java programming language other than boolean form the numeric types of the JVM 100. The numeric types are divided between the integral types (such as byte, short, int, long, and char) and floating-point types (such as float and double). The part of a Java Virtual Machine implementation that takes care of finding and loading types is the class loader subsystem, implemented through the loader environment 200 of the running, Java application.

Information about loaded types is stored in a logical area of memory called the loader environment 200. When the JVM 100 loads a type, it uses a class loader to locate the appropriate class file. The class loader reads in the class file 124 (a linear stream of binary data) and passes it to the JVM 100. The JVM 100 extracts information about the type from the binary data and stores the information in the loader environment 200. Memory for class (static) variables declared in the class is also taken from the loader environment 200.

The size of the loader environment 200 need not be fixed. As the Java application runs, the JVM 100 can expand and contract the loader environment 200 to fit the needs of the application. Implementations allow users or programmers to specify an initial size for the loader environment 200, as well as a maximum or minimum size.

The loader environment 200 can also be garbage collected by a garbage collection thread located in the function component 10. Because Java programs can be dynamically extended via class loader objects, classes can become "unreferenced" by the application. If a class becomes unreferenced, a JVM 100 can unload the class with the garbage collector thread to keep the memory occupied by the loader environment 200 at a minimum.

Figure 2:
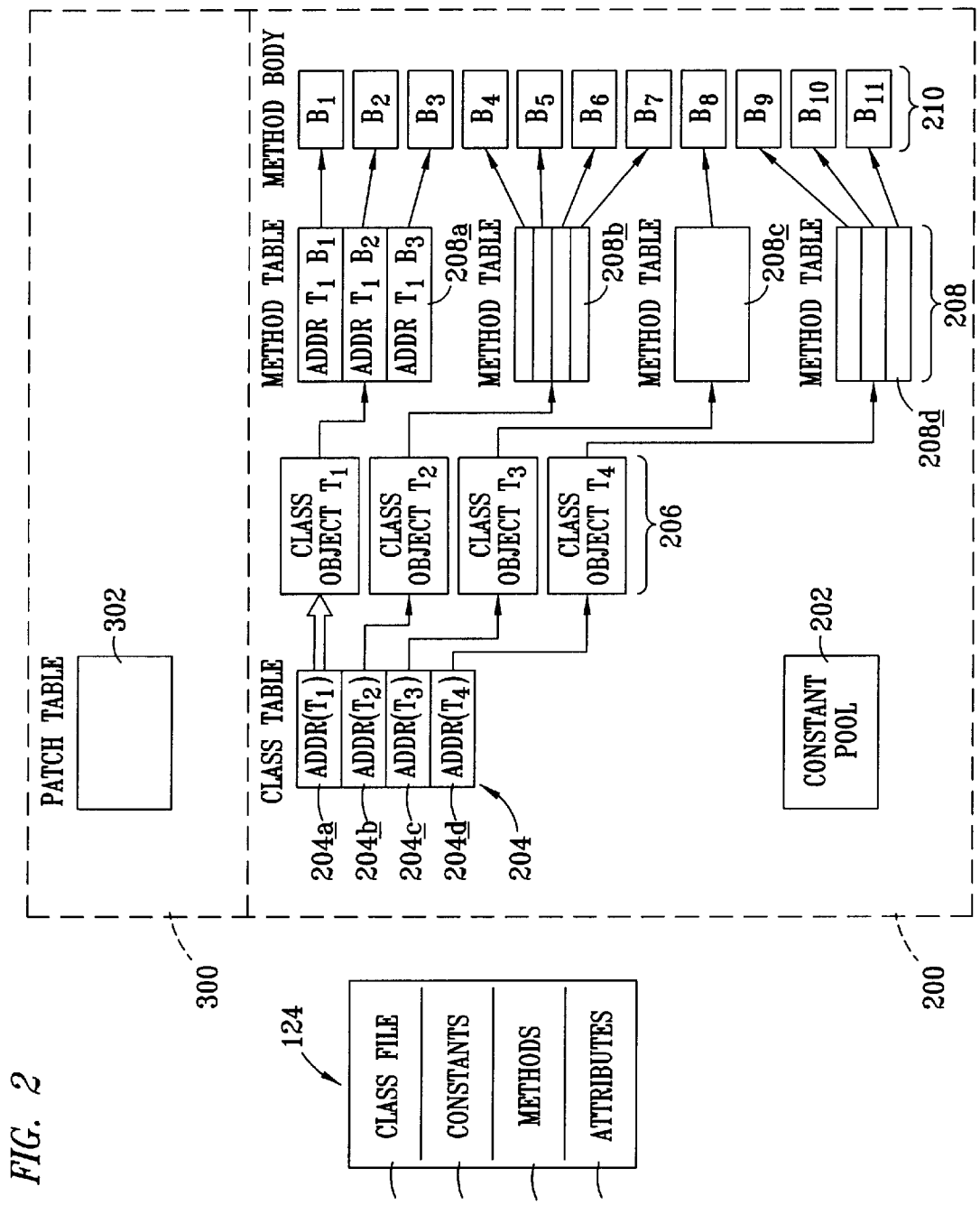
FIG. 2 is a block diagram illustrating a patch environment of the present invention for modifying a loader environment of the JVM.

FIG. 2 is a block diagram representing the loader environment 200. The loader environment depicted is simplified for clarity for use in describing application and use of the invention herein. It can be readily appreciated that more complex JVM structures with larger class tables and associated memory structures can be deployed that can similarly deploy a patching environment for modifying the JVM 100 without the need to first halt the JVM.

A file of Java source code has the extension ".java" It consists of an optional package statement followed by any number of "import" statements followed by one or more "class" or "interface" definitions.

Each "class" or interface definition in a "java" file is compiled into a separate file. These files of compiled Java method bodies (bytecodes) are known as class files 124, and must have the same name as the class or interface they define, with the extension ".class" appended.

The Java class file 124 contains everything a JVM 100 needs to know about one Java class or interface, and is set out in a precise definition of the class file format to ensure that any Java class file can be loaded and correctly interpreted by any JVM 100, no matter what computer system produced the class file 124 or what system hosts the JVM 100. The class file 124 includes a what is known as a magic number—OxCAFEBABE—that designates it as a Java file. The class file also has a version number, a constant pool 130, a $method_{13}$ info portion 132, and an attributes portion 134. The constant pool 130 contains the constants associated with the class or interface defined by the file. Constants such as literal strings, final variable values, class names, and method names are stored in the constant pool 130. After the constant pool 130 is the $method_{13}$ info portion 132 that contains information about a method, including the method name and descriptor (for example, the return type and argument types). If the method is not abstract, the $method_{13}$ info portion 132 includes the number of memory stack words (a word having sixteen bits) required for the local methods, the maximum number of memory stack words required for the operand stack of the method, a table of exceptions caught by the method, the method body sequence, and optional line number and local variable tables.

The last component in the class file 124 is the attributes portion 134, which gives general information about the particular class or interface defined by the class file 124. The attributes 134 has an $attributes_{13}$ count field, and a count of the number of attribute_info tables appearing in the subsequent attributes list. The first item in each attributes portion 134 is an index into the constant pool 130 of a $CONSTANT_{13}$ $Utf8_{13}$ info table that gives the name of the attribute. Attributes come in many varieties. Several varieties are defined by the JVM Specification, discussed above, but varieties of attributes, according to well known rules, can be created and placed into the class file 124.

Upon loading, the class file 124 provides data to create a runtime version of the class file as a class object with a method table 208, or methods associated with the class object. The new class may refer to attributes of any previously-loaded class if it was compiled against that class.

For each class, as dictated by a class file 124, a constant pool 202 associated with that class stores the constants 130. A constant pool is an ordered set of constants used by the class, including literals (string, integer, and floating-point constants) and symbolic references to types, fields, and methods.

For each method 132 declared in the class file 124, the following information must be stored in the loader environment 200: (1) name of the method, (2) return type (or void) of the method, (3) the number and types (in order) of the method parameters, and (4) the method modifiers (some subset of public, private, protected, static, final, synchronized, native, abstract).

The method information taken from the class files 124 is divided into a class table 204, a class object set 206, a method table set 208, and a set of method bodies 210. The class table 204 points to a corresponding set of class objects 206. Each of the class objects $T_1$, $T_2$, $T_3$, and $T_4$ refer to a corresponding method table 208. Each method table 208 has pointers to point to a corresponding set of method bodies 210. As shown in FIG. 2, the loader environment has four classes in the class table 204. The address in the first class, ADDR(T1), points to the class_object(T1) of the set of class objects 206. The class$_{13}$object($T_1$) points to method_tb1 (A). Method$_{13}$ tb1 (A) contains pointers ADDR($T_1$, $B_1$), ADDR($T_1$,$B_2$), and ADDR($T_1$,$B_3$), which point to method bodies $B_1$, $B_2$, and $B_3$, accordingly.

The data structures 204, 206, and 208 are used to allow ease of access to the method bodies $B_1$, $B_2$, $B_3$, . . . $B_{11}$, stored in the loader environment 200. An example of such a data structure is a method table. For each non-abstract class the JVM 100 loads into the class table 204, the JVM 100 generates a corresponding method table 208. A method table is an array of direct references to all the instance method bodies that may be invoked on a class instance.

Referring to FIG. 2, illustrated is a schematic diagram of a runtime patch environment 300 for the JVM 100. In systems that cannot be readily brought down in a controlled manner or take a large amount of time to bring down, it is preferred to modify or "patch" the program while the JVM is loaded onto its platform and operational to avoid the time and expense otherwise required.

An empty patch environment is part of the patch-capable JVM 100, and is acted on by the JVM 100 to create the patch environment 300, which is related to the loader environment 200. It should be noted that discrete memory regions can be allocated to the loader environment 200 and the patch environment 300, memory regions can be shared using conventional memory management techniques, or a hybrid memory structure can employ both allocation and memory management techniques.

For the block diagram representation shown in FIG. 2, the JVM 100 has defined a patch table data structure 302 in the patch environment 300. The data structure 300 is empty and has not yet been loaded with a patch through a patch file.

Figure 3:
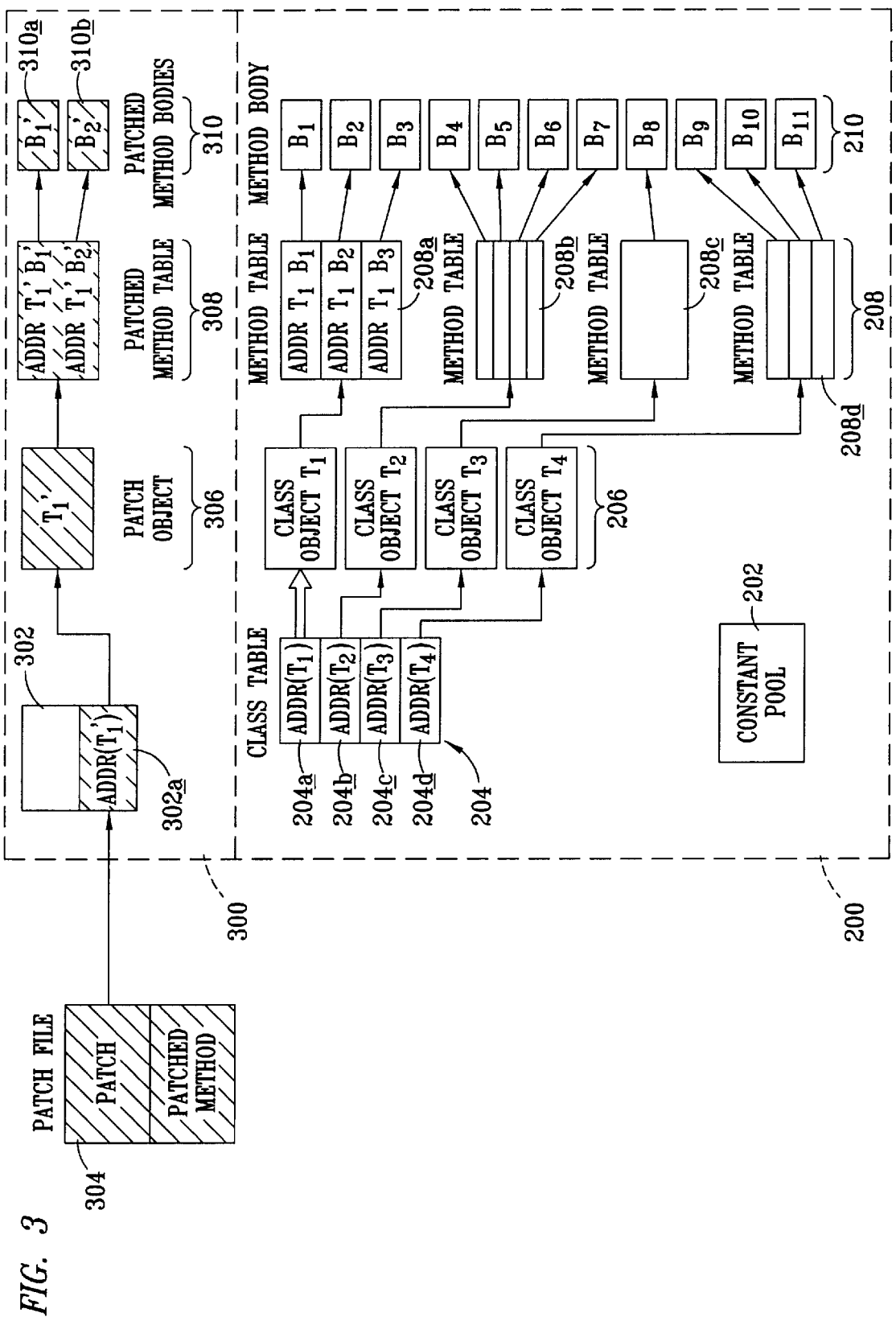
FIG. 3 is a block diagram illustrating the patch environment of the present invention for modifying a method body of the loader environment of the JVM.

FIG. 3 is a block diagram illustrating the loading of a patch in the JVM 100. The shaded regions indicate the program structure additions generated by the JVM 100 based on the patch file 304. There are two primary patching implementations that can be conducted through the use of the patch file 304. First, altering an existing method body with a patch. Second, adding a method body with a patch.

For either of these forms of patching, a patch file 304 is generated by selecting changed, or patched, method bodies (bytecodes).

The changes are made to Java classes that are set out in the class table 204 of the loader environment 200. After making the desired changes to one or more Java classes, a patch file 304 is generated. The patch file 304 is sufficiently similar to the class file to generate a JVM patch structure similar to that in the loader environment 200. That is, the JVM 100, based on the patched-method information in the patch file 304, generates a patch object data structure 306, a patched-method table data structure 308, and a patched-method bodies data structure 310. The JVM 100 loads, in respective data structures, a patch class 302a, a class table entry 302a, a class object 306a, a patched method table entry 308a, and patched method bodies 310a and 310b. Accordingly, the patch class 302a has a pointer ADDR($T_1$') to the patch object $T_1$'. The patch object $T_1$' refers to the patched method table 308. The patched method table 308 contains pointers ADDR(T', $B_1$') and ADDR($T_1$', $B_2$') to the patched method bodies 310a and 310b, accordingly. It should be noted that the use of the prime notation "'" indicates a Java patch that to a pre-loaded portion of a Java component in the JVM 100.

Once the Java strcuture, as dictated by the patch file 304, is generated, then the patched object bodies can be applied to the loader environment 200.

Figure 4:
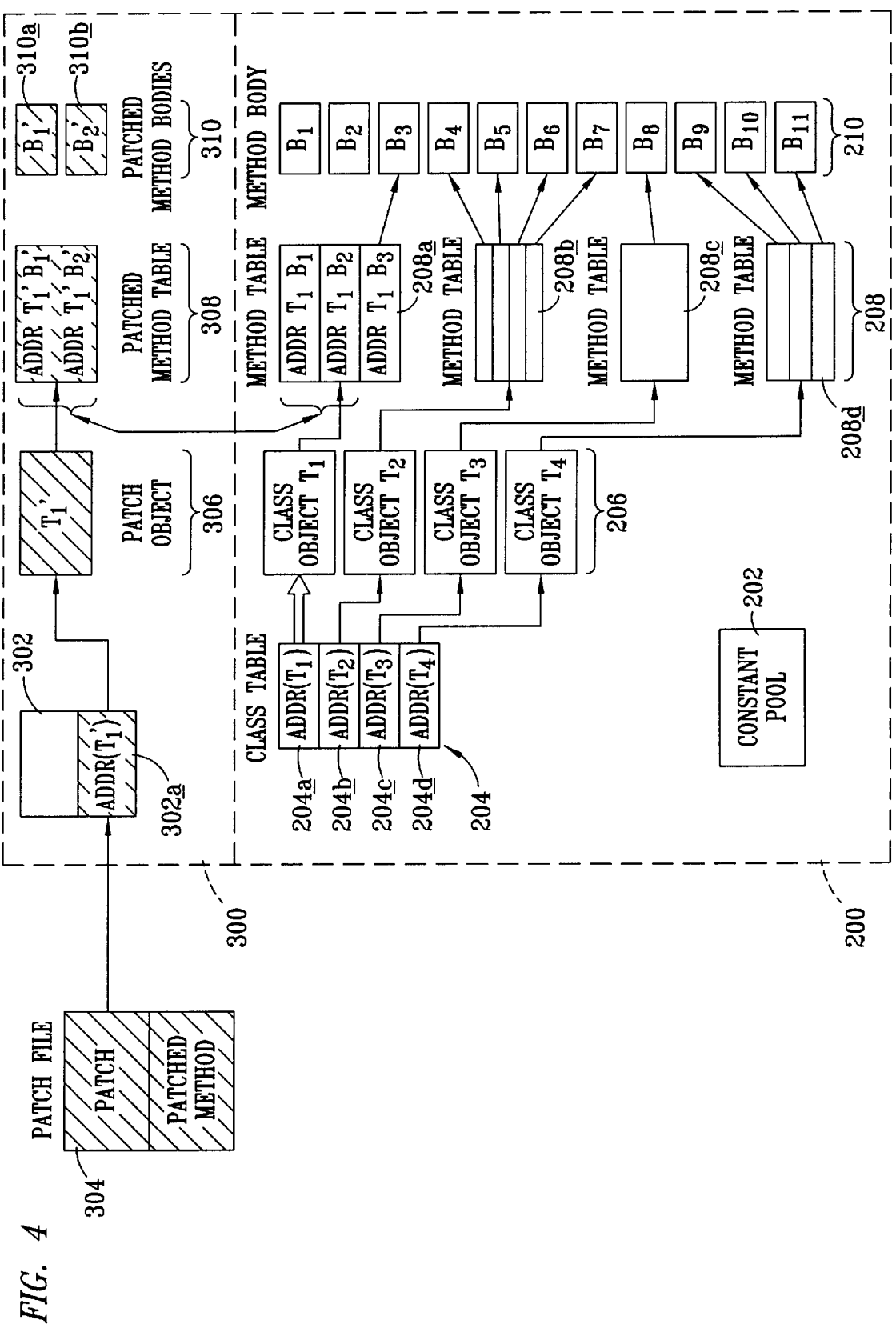
FIG. 4 is a block diagram illustrating the application of a patch to modify a method body of the loader environment of the JVM.

Altering a method body with a patched-method is shown in FIG. 4. To alter the method body, the pointers in the patched-method table 308 are exchanged with the pointers in the method table 208a in the loader environment 200. That is, the pointers ADDR($T_1$, $B_1$) and ADDR($T_1$, $B_2$) in the method table 208a are exchanged with the pointers ADDR($T_1$', $B_1$') and ADDR($T_1$', $B_2$') of the patched-method table 308.

Figure 5:
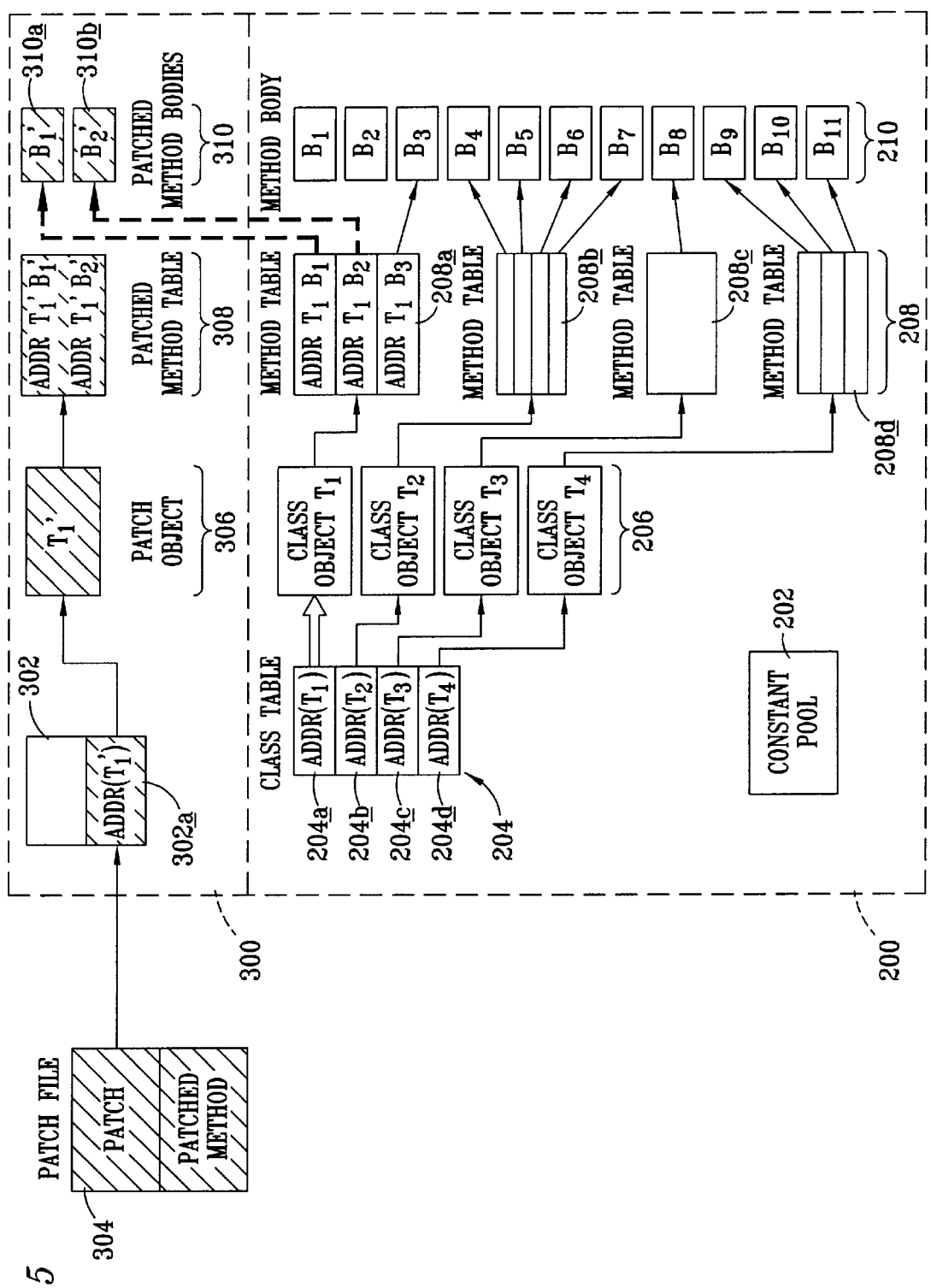
FIG. 5 is a block diagram illustrating the application of a patch to add a method body to the loader environment of the JVM.

As is illustrated in FIG. 5, following implementation of the patch, the method table 208a directs a call to the patched-method bodies $B_1$' and $B_2$' in the patched environment 300, as depicted through the double-dashed lines. In this manner, the method bodies for the previously-loaded classes are altered with the patched-method bodies, and any necessary compiling/linking of the new bodies can take place.

Figure 6:
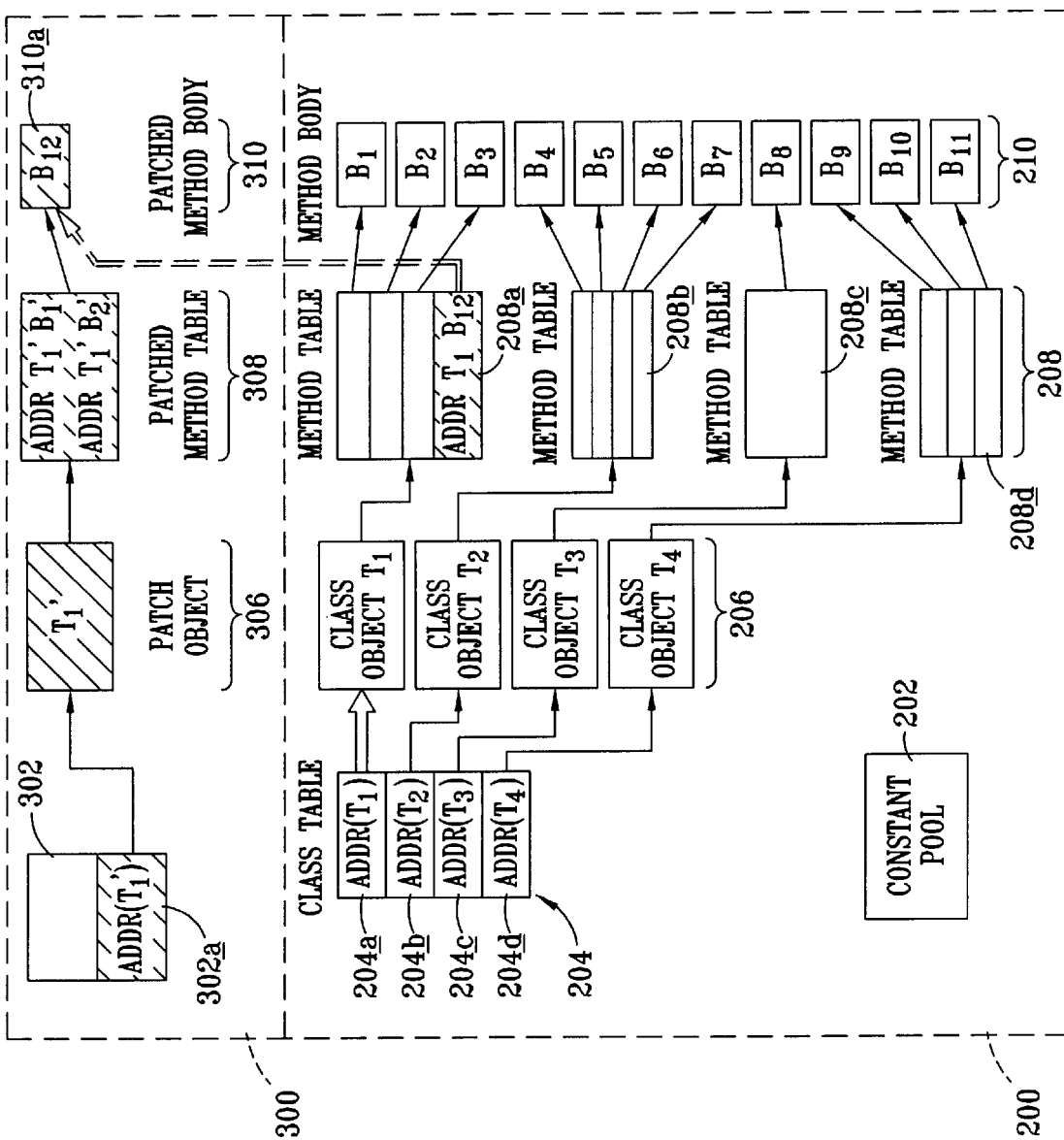
FIG. 6 is a block diagram illustrating synchronization of the application of a patch to modify a method body of the loader environment of the JVM in synchrony with execution of other code of the JVM.

Referring to FIG. 6, in the alteration of the method bodies, the application of the patch is synchronized with respect to the execution of other code in the JVM 100 so that no interruption of function or service is necessary to apply the patch. Also, the old method bodies are retained so that the patched class can be removed by re-installing the original method bodies by reversing the swap of the pointers to the method bodies.

Referring to FIG. 6, the pointer ADDR($T_1$', $B_{12}$) is appended as an element to the data structure 208a, which can be a table, array, or the like, to implement a patch adding a method body $B_{12}$ to the patch environment 300. Accordingly, a call to the class at the class table 204, to the pointer ADDR($T_1$) points to the class_obj($T_1$). class_obj ($T_1$) then points to the method table 208a. Dependent upon the action required to be taken by the class $T_1$, the added method body $B_{12}$ is pointed to by the pointer ADDR($T_1$', $B_{12}$).

Although the invention has been described with reference to a specific embodiment, these descriptions are not meant to be construed in a limiting sense.

Various modifications of the disclosed embodiments, as well as alternative embodiments of the invention will become apparent to persons skilled in the art upon reference to the description of the invention. It is therefore contemplated that the claims will cover any such modifications or embodiments that fall within the true scope and spirit of the invention.

What is claimed is:

1. A patch environment within a Java Virtual Machine ("JVM") executing on a computer, the JVM having a loader environment containing information about software objects loaded on the computer through the JVM, the patch environment comprising:

a patch data structure defined on an electronic memory of the computer, having at least one Java patch for modifying the loader environment of the JVM, wherein the patch data structure comprising at least one method table and at least one associated method body;

at least one data item contained in the patch data structure defined on the electronic memory of the computer, identifying each patch of said patch data structure; and a second data item associated with each of the identified patches contained in the patch data structure defined on the electronic memory of the computer for modifying the loader environment of the JVM.

2. The patch environment of claim 1 further comprising:

a link between said at least one patch and the loader environment for moving said at least one patch between the patch environment and the loader environment.

3. The patch environment of claim 1 wherein said patch data structure is an array.

4. The patch environment of claim 1 wherein said patch modifies a method body in the loader environment of the JVM by altering a method body in the loader environment.

5. The patch environment of claim 1 wherein said patch modifies a method body in the loader environment of the JVM by adding a method body in the loader environment.

6. A method of applying an ordered set of changes to an executing Java program on a computer, without interrupting the execution of the Java program, the method comprising the steps of:

(a) providing a Java Virtual Machine ("JVM") in a memory of the computer, the JVM having a loader environment wherein the Java program is loaded for execution;

(b) executing the Java program;

(c) creating a patch environment in a memory of the computer such that the patch environment can interact with the loader environment;

(d) generating a patch file having a patch;

(e) loading the patch file into the patch environment, such that the loaded patch file comprising at least one patched method table entry and at least one associated patched method body, said at least one patched method table entry having a pointer directed to said at least one associated patched method body; and (f) applying the patch to the executing Java program.

7. The method of claim 6, wherein the step of applying the patch to the Java program includes altering a method body in the loader environment.

8. The method of claim 6, wherein the step of applying a patch to the Java program includes adding a method body.

9. A method of applying an ordered set of changes to an executing Java class file on a computer, without interrupting the execution of the Java class file, the method comprising the steps of:

(a) providing a Java Virtual Machine ("JVM") in a memory of the computer, the JVM having a loader environment wherein the Java class file is loaded for execution, the Java class file having a JVM class structure comprising at least one method table and at least one associated method body, said at least one method table having a pointer directed to said at least one associated method body;

(b) executing the Java class file;

(c) creating a patch environment in a memory of the computer such that the patch environment can interact with the loader environment;

(d) generating a patch file having a patch;

(e) loading the patch file into the patch environment, the loaded patch file being substantially similar to the class file to generate a JVM patch structure similar to the JVM class structure in the loader environment; and (f) applying the patch to the executing Java program.

10. A method of altering an executing Java class file on a computer, without interrupting the execution of the Java class file, the method comprising the steps of:

(a) providing a Java Virtual Machine ("JVM") in a memory of the computer, the JVM having a loader environment wherein the Java class file is loaded for execution, the loaded Java class file having a JVM class structure comprising at least one method table and at least one associated method body, said at least one method table having a first pointer directed to said at least one associated method body;

(b) executing the Java class file;

(c) creating a patch environment in a memory of the computer such that the patch environment can interact with the loader environment;

(d) generating a patch file having a patch;

(e) loading the patch file into the patch environment, the loaded patch file comprising at least one associated patched method table entry and at least one patched method body, said at least one patched method table entry having a second pointer directed to said at least one associated patched method body; and (f) replacing said at least one method body with said at least one patched method body by exchanging the first pointer with the second pointer.

11. The method of claim 10 further comprising the additional step of:

(g) restoring said at least one method body by reversing the swap of the first and second pointers.

12. A method of adding a new program component to an executing Java class file on a computer, without interrupting the execution of the Java class file, the method comprising the steps of:

(a) providing a Java Virtual Machine ("JVM") in a memory of the computer, the JVM having a loader environment wherein the Java class file is loaded for execution, the loaded Java class file having a JVM class structure comprising at least one method table and at least one associated method body, said at least one method table having a first pointer directed to said at least one associated method body;

(b) executing the Java class file;

(c) creating a patch environment in a memory of the computer such that the patch environment can interact with the loader environment;

(d) generating a patch file having a patch;

(e) loading the patch file into the patch environment, the loaded patch file comprising at least one patched method table entry and at least one associated patched method body, said at least one patched method table entry having a second pointer directed to said at least one associated patched method body; and (f) adding said at least one patched method body to the executing Java class file by appending the second pointer to said at least one method table.

* * * * *

UNITED STATES PATENT AND TRADEMARK OFFICE
CERTIFICATE OF CORRECTION

PATENT NO. : 6,202,208 B1
DATED : March 13, 2001
INVENTOR(S) : Holiday, Jr.

It is certified that error appears in the above-identified patent and that said Letters Patent is hereby corrected as shown below:

Column 5,
Line 64, delete "10" and insert -- 110 --

Column 6,
Line 29, delete "method$_{13}$info" and insert -- method_info --
Line 34, delete "method$_{13}$info" and insert -- method_info --
Line 37, delete "method$_{13}$info" and insert -- method_info --
Line 47, "delete "attributes$_{13}$count" and insert -- attributes_count --
Line 51, delete "STANT$_{13}$ Utf8$_{13}$info" and insert -- STANT_Utf8_info --

Column 7,
Line 18, delete "class$_{13}$object(T$_1$)" and insert -- class_object(T$_1$) --
Line 18, delete "method_tb1" and insert -- method_tbl --
Line 19, delete "Method$_{13}$tb1" and insert -- Method_tbl --

Column 8,
Line 9, delete "ADDR(T',B$_1$')" and insert -- ADDR(T$_1$',B$_1$') --

Column 10,
Line 26, delete "associated"
Line 27, after "one", insert -- associated --.

Signed and Sealed this

Fifth Day of February, 2002

Attest:

JAMES E. ROGAN
Attesting Officer  Director of the United States Patent and Trademark Office